US012727015B2

(12) United States Patent
Koskinen et al.

(10) Patent No.: US 12,727,015 B2
(45) Date of Patent: Sep. 1, 2026

(54) OPTIMIZED UE CAPABILITY

(71) Applicant: Nokia Technologies Oy, Espoo (FI)

(72) Inventors: Jussi-Pekka Koskinen, Oulu (FI); Samuli Heikki Turtinen, Oulu (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/888,983

(22) Filed: Sep. 18, 2024

(65) Prior Publication Data

US 2025/0106880 A1 Mar. 27, 2025

Related U.S. Application Data

(60) Provisional application No. 63/539,712, filed on Sep. 21, 2023.

(51) Int. Cl.

*H04W 72/51* (2023.01)
*H04W 72/0453* (2023.01)
*H04W 72/1268* (2023.01)
*H04W 76/20* (2018.01)

(52) U.S. Cl.

CPC ....... *H04W 72/51* (2023.01); *H04W 72/0453* (2013.01); *H04W 72/1268* (2013.01); *H04W 76/20* (2018.02)

(58) Field of Classification Search

CPC ............. H04W 72/51; H04W 72/0453; H04W 72/1268; H04W 76/20

See application file for complete search history.

(56) References Cited

U.S. PATENT DOCUMENTS

2013/0188628 A1* 7/2013 Lee ........................ H04W 40/08 370/338
2020/0100100 A1* 3/2020 Raymond ............. H04W 60/06
2021/0329444 A1 10/2021 Wiemann et al.

(Continued)

FOREIGN PATENT DOCUMENTS

EP 4187938 A1 * 5/2023 .............. H04W 4/06
WO 2020/167235 A1 8/2020
WO 2023081608 A1 5/2023

OTHER PUBLICATIONS

Extended European Search Report received for corresponding European Patent Application No. 24197830.3, dated Jan. 29, 2025, 10 pages.

(Continued)

*Primary Examiner* — Parth Patel

(74) *Attorney, Agent, or Firm* — McCarter & English, LLP

(57) ABSTRACT

An apparatus configured to: receive, from a network node, a user equipment capability enquiry; determine whether ignoring a capability filter in a cell is allowed; generate a capability information message based, at least partially, on a determination of whether ignoring the capability filter in the cell is allowed; and transmit, to the network node, the capability information message. An apparatus configured to: provide, to a user equipment, an indication of whether the user equipment is allowed to ignore a capability filter in a cell; provide, to the user equipment, a user equipment capability enquiry with respect to, at least, the capability filter; and receive, from the user equipment in response to the user equipment capability enquiry, a capability information message.

18 Claims, 3 Drawing Sheets

(56) References Cited

U.S. PATENT DOCUMENTS

2021/0400755 A1* 12/2021 Van Der Velde ..... H04W 76/16
2022/0007176 A1* 1/2022 Lindheimer .......... H04L 9/3239
2022/0078605 A1 3/2022 Alnas et al.
2022/0312190 A1* 9/2022 Palle Venkata ....... H04W 48/02
2022/0312298 A1* 9/2022 Palle Venkata ......... H04W 8/24
2022/0394450 A1* 12/2022 Ioffe ................... H04W 74/002
2022/0417880 A1* 12/2022 Priyanto ........... H04W 56/0015
2023/0037839 A1* 2/2023 Gupta ..................... H04W 8/24
2023/0077812 A1* 3/2023 Nanda ................... H04W 48/10 370/331
2023/0188261 A1* 6/2023 Awadin ................. H04L 1/1864 370/329
2023/0269639 A1* 8/2023 Lei ...................... H04W 72/044 370/331
2023/0269817 A1* 8/2023 Lei .......................... H04L 5/003 370/328
2023/0337173 A1* 10/2023 Zhou ..................... G01S 5/0036
2023/0379904 A1* 11/2023 Kim .................. H04W 74/0838
2024/0243895 A1* 7/2024 Rastegardoost ...... H04W 72/51
2024/0323693 A1* 9/2024 Aydin ................. H04L 63/1441
2024/0356625 A1* 10/2024 Walker ............... H04B 7/15528
2024/0406818 A1* 12/2024 Cui ................... H04W 36/0085
2025/0024457 A1* 1/2025 Elshafie ................ H04W 72/23
2025/0071700 A1* 2/2025 Cui ................... H04W 56/0055
2025/0106880 A1* 3/2025 Koskinen .............. H04W 76/20
2025/0119961 A1* 4/2025 Huang .................... H04W 4/70
2025/0220638 A1* 7/2025 Xie ....................... H04W 68/02
2025/0330965 A1* 10/2025 Zhang ............... H04W 72/0453

OTHER PUBLICATIONS

Office action received for corresponding Taiwan Patent Application No. 113135490, dated Mar. 31, 2025, 3 pages of office action and 1 pages of translation available.

"3rd Generation Partnership Project; Technical Specification Group Radio Access Network; NR; NR and NG-RAN Overall Description; Stage 2 (Release 18)", 3GPP TS 38.300, V18.0.0, Dec. 2023, pp. 1-265.

"3rd Generation Partnership Project; Technical Specification Group Radio Access Network; NR; User Equipment (UE) radio access capabilities (Release 18)", 3GPP TS 38.306, V18.0.0, Dec. 2023, pp. 1-303.

"3rd Generation Partnership Project; Technical Specification Group Radio Access Network; NR; Radio Resource Control (RRC) protocol specification (Release 18)", 3GPP TS 38.331, V18.0.0, Dec. 2023, pp. 1-1608.

"3rd Generation Partnership Project; Technical Specification Group Radio Access Network; Study on further NR RedCap UE complexity reduction (Release 18)", 3GPP TR 38.865, V18.0.0, Sep. 2022, pp. 1-52.

"Discussion on optional UE capability filter for eRedCap UE", 3GPP TSG-RAN2 Meeting #123, R2-2308825, Agenda: 7.19.3, Qualcomm Incorporated, Aug. 21-25, 2023, pp. 1-17.

"Discussion on further UE complexity reduction", 3GPP TSG RAN WG2 Meeting#123, R2-2307485, Agenda: 7.19.3, CEPRI, Aug. 21-25, 2023, pp. 1-4.

"3rd Generation Partnership Project; Technical Specification Group Radio Access Network; NR; Radio Resource Control (RRC) protocol specification (Release 17)", 3GPP TS 38.331, V17.5.0, Jun. 2023, pp. 1-1328.

"3rd Generation Partnership Project; Technical Specification Group Radio Access Network; NR; NR and NG-RAN Overall Description; Stage 2 (Release 17)", 3GPP TS 38.300, V17.5.0, Jun. 2023, pp. 1-211.

U.S. Appl. No. 63/539,720, "Indication of UE capability usage", filed Sep. 21, 2023, pp. 1-54.

"Discussion on optional UE capability filter for eRedCap UE", 3GPP TSG-RAN2 Meeting #122, R2-2305797, Agenda: 7.19.3, Qualcomm Incorporated, May 22-26, 2023, pp. 1-3.

* cited by examiner

200

300 provide, to a user equipment, an indication of whether the user equipment is allowed to ignore a capability filter in a cell

310 provide, to the user equipment, a user equipment capability enquiry with respect to, at least, the capability filter

320 receive, from the user equipment in response to the user equipment capability enquiry, a capability information message

330

OPTIMIZED UE CAPABILITY

TECHNICAL FIELD

The example and non-limiting embodiments relate generally to capability information reporting and, more particularly, to use of a capability filter.

BACKGROUND

It is known, in network communication, to indicate, to a UE, a set of frequency bands for which the UE capability is to be reported.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: receive, from a network node, a user equipment capability enquiry; determine whether ignoring a capability filter in a cell is allowed; generate a capability information message based, at least partially, on a determination of whether ignoring the capability filter in the cell is allowed; and transmit, to the network node, the capability information message.

In accordance with one aspect, a method comprising: receiving, with a user equipment from a network node, a user equipment capability enquiry; determining whether ignoring a capability filter in a cell is allowed; generating a capability information message based, at least partially, on a determination of whether ignoring the capability filter in the cell is allowed; and transmitting, to the network node, the capability information message.

In accordance with one aspect, an apparatus comprising means for: receiving, from a network node, a user equipment capability enquiry; determining whether ignoring a capability filter in a cell is allowed; generating a capability information message based, at least partially, on a determination of whether ignoring the capability filter in the cell is allowed; and transmitting, to the network node, the capability information message.

In accordance with one aspect, a non-transitory computer-readable medium comprising program instructions stored thereon for performing at least the following: causing receiving, from a network node, of a user equipment capability enquiry; determining whether ignoring a capability filter in a cell is allowed; generating a capability information message based, at least partially, on a determination of whether ignoring the capability filter in the cell is allowed; and causing transmitting, to the network node, of the capability information message.

In accordance with one aspect, an apparatus comprising: at least one processor; and at least one memory storing instructions that, when executed by the at least one processor, cause the apparatus at least to: provide, to a user equipment, an indication of whether the user equipment is allowed to ignore a capability filter in a cell; provide, to the user equipment, a user equipment capability enquiry with respect to, at least, the capability filter; and receive, from the user equipment in response to the user equipment capability enquiry, a capability information message.

In accordance with one aspect, a method comprising: providing, with a base station to a user equipment, an indication of whether the user equipment is allowed to ignore a capability filter in a cell; providing, to the user equipment, a user equipment capability enquiry with respect to, at least, the capability filter; and receiving, from the user equipment in response to the user equipment capability enquiry, a capability information message.

In accordance with one aspect, an apparatus comprising means for: providing, to a user equipment, an indication of whether the user equipment is allowed to ignore a capability filter in a cell; providing, to the user equipment, a user equipment capability enquiry with respect to, at least, the capability filter; and receiving, from the user equipment in response to the user equipment capability enquiry, a capability information message.

In accordance with one aspect, a non-transitory computer-readable medium comprising program instructions stored thereon for performing at least the following: causing providing, to a user equipment, of an indication of whether the user equipment is allowed to ignore a capability filter in a cell; causing providing, to the user equipment, of a user equipment capability enquiry with respect to, at least, the capability filter; and causing receiving, from the user equipment in response to the user equipment capability enquiry, of a capability information message.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
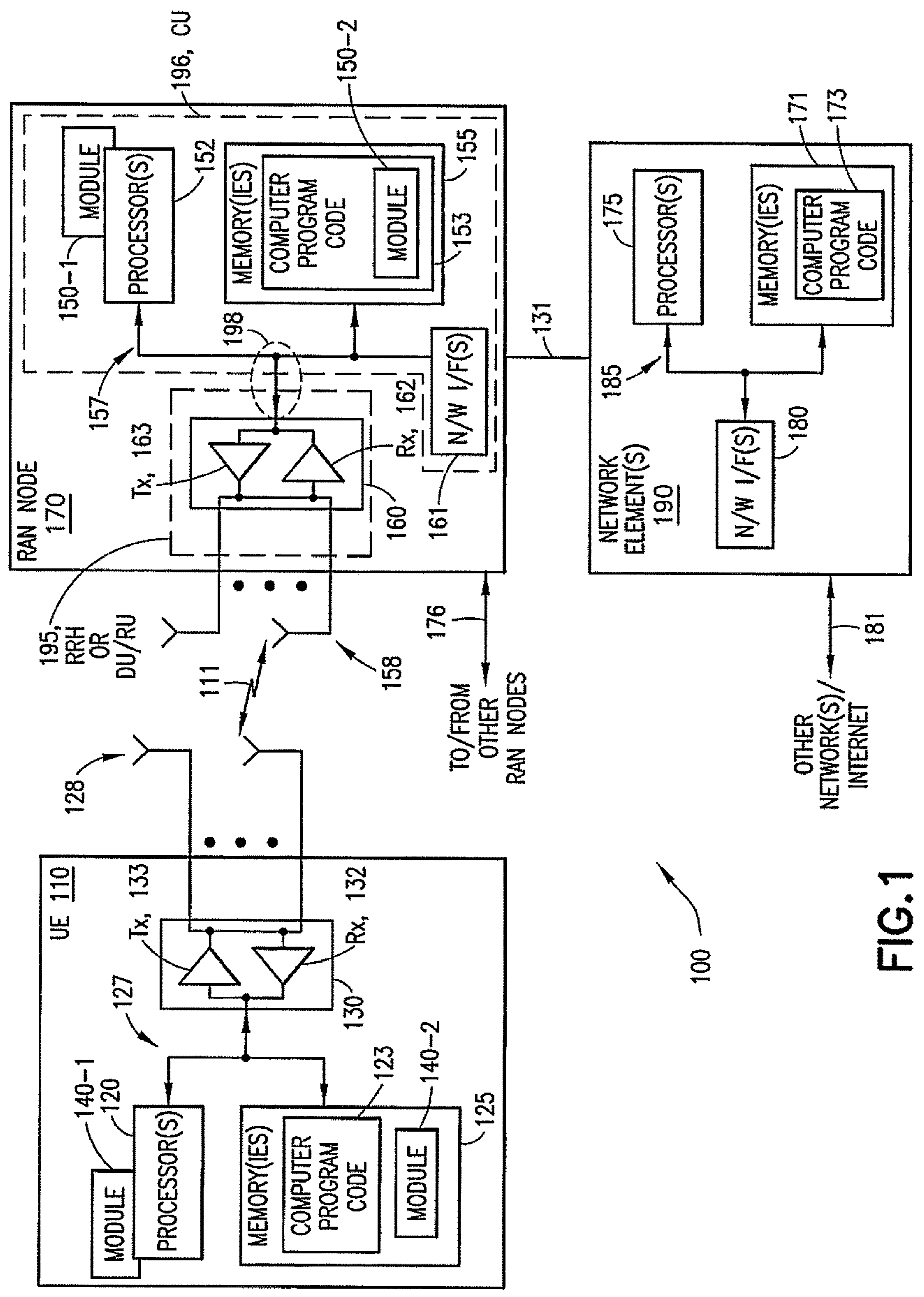
FIG. 1 is a block diagram of one possible and non-limiting example system in which the example embodiments may be practiced.

The following abbreviations that may be found in the specification and/or the drawing FIGURES are defined as follows:

3GPP third generation partnership project
5G fifth generation
5GC 5G core network
AMF access and mobility management function
BB baseband
BWP bandwidth part
CA carrier aggregation
cRAN cloud radio access network
CU central unit
DC dual connectivity
DL downlink
DRX discontinuous reception
DU distributed unit
eDRX enhanced discontinuous reception
eMBB enhance mobile broadband
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC E-UTRA evolved universal terrestrial radio access, i.e., the LTE radio access technology
FDD frequency division duplex
gNB (or gNodeB) base station for 5G/NR, i.e., a node providing NR user plane and control plane protocol terminations towards the UE, and connected via the NG interface to the 5GC
HD-FDD half-duplex frequency division duplex
I/F interface
IoT Internet of Things
L1 layer 1
LPWA low power wide area
LTE long term evolution
MAC medium access control
MME mobility management entity
ng or NG new generation
ng-eNB or NG-eNB new generation eNB
NR new radio
N/W or NW network
O-RAN open radio access network
PDCP packet data convergence protocol
PDSCH physical downlink shared channel
PHY physical layer
PUSCH physical uplink shared channel
QAM quadrature amplitude modulation
RAN radio access network
RedCap reduced capability
RF radio frequency
RLC radio link control
RRC radio resource control
RRH remote radio head
RS reference signal
RU radio unit
Rx receiver
SDAP service data adaptation protocol
SDU service data unit
SGW serving gateway
SMF session management function
Tx transmitter
UE user equipment (e.g., a wireless, typically mobile device)
UL uplink
UPF user plane function
VNR virtualized network function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein may generally relate to reduced capability (RedCap) NR devices. RedCap devices have reduced capabilities versus NR enhanced mobile broadband (eMBB) capable UEs, as they are targeted to serve in IoT like scenarios, applying UE complexity reduction, and hence neither support of carrier aggregation (CA)

nor or dual connectivity (DC) is mandated. RedCap UEs may have reduced capabilities such as: bandwidth (BW) of 20 MHz for frequency range 1 (FR1), BW of 50 or 100 MHz for frequency range 2 (FR2), reduced number of antennas (e.g. 1 Tx antenna, 1 or 2 Rx antenna depending on FR and band), limited peak data rates, restricted modulation levels (e.g. 64 quadrature amplitude modulation (QAM) in downlink (DL) and 16-QAM in uplink (UL)) and/or optional half-duplex frequency division duplex (FDD). RedCap devices may include devices with relatively low complexity, cost, and/or size. Use cases for RedCap UE and example embodiments of the present disclosure may include, but are not limited to, industrial Internet of Things (IoT) sensors, wireless sensors, video surveillance devices, Internet of Things (IoT) devices, wearables, and/or devices used for transportation, tracking, infrastructure, agriculture, smart cities, etc. Wearables may include sensors in contact with or near skin, smart fabric, heart rate monitors, temperature monitors, etc. RedCap UEs might only deploy the minimum number of RF chains (i.e. single RF chain).

RAN has agreed to a work item on enhanced support of reduced capability NR devices with the following justification and objectives:

" . . . Justification

One 5G aim is to accelerate industrial transformation and digitalization, which improve flexibility, enhance productivity and efficiency, reduce maintenance, and improve operational safety. Industrial sensors play an important role for realizing such a vision. Not only widely used in industrial automation and digitalization use cases, industrial sensors are also widely used in the general environmental monitoring use cases such as monitoring of critical infrastructure (e.g., buildings, bridges, water dams, etc.) or monitoring for natural disasters (e.g., wild fire, flood, tsunami, earthquake, etc.).

Another emerging new class of new 5G use cases is the smart city vertical, which covers data collection and processing to more efficiently monitor and control city resources, and to provide services to city residents. Especially, the deployment of surveillance cameras is an essential part of the smart city but also of factories and industries.

Furthermore, there have been increasing interests in wearables use cases such as smart watches, eHealth related devices, and medical monitoring devices. These use cases call for different design considerations and have different requirements in terms of form factor, UE complexity and energy efficiency, compared to eMBB devices.

The support of industrial sensors, video surveillance, and wearables were the motivations behind Rel-17 RedCap. Through the Rel-17 NR RedCap work item, 3GPP has established a framework for enabling reduced capability NR devices suitable for a range of use cases, including the industrial sensors, video surveillance, and wearables use cases, with requirements on low UE complexity and sometimes also on low UE power consumption.

To further expand the market for RedCap use cases with relatively low cost, low energy consumption, and low data rate requirements, e.g., industrial wireless sensor network use cases, some further complexity reduction enhancements should be considered.

Rel-18 RedCap should provide NR support for low-tier devices between existing LPWA UEs and the capabilities of Rel-17 RedCap UEs. The supported peak data rate for Rel-18 RedCap targets to 10 Mbps. Rel-18 RedCap should not overlap with existing LPWA solutions.

The enhancements should be introduced while maintaining the integrity of the RedCap ecosystem and maximizing the benefit of economies of scale. The WI targets enhancements applicable to the RedCap framework defined in Rel-17, including principles of network awareness of device capabilities.

Techniques for further UE complexity reduction have been studied in the study item documented in TR 38.865 . . . "

And Objectives:

" . . . Objective

The Objective is to Specify Support for the Following Enhancements:

Power Saving/Energy Efficiency Enhancements

Enhanced eDRX in RRC_INACTIVE (>10.24 s) [RAN2, RAN3, RAN4]

Note that this objective requires SA2, CT1 and CT4 involvement

Complexity/Cost Reduction

Further reduced UE complexity in FR1 [RAN1, RAN2, RAN4]

UE BB bandwidth reduction

5 MHz BB bandwidth only for PDSCH (for both unicast and broadcast) and PUSCH, with 20 MHz RF bandwidth for UL and DL The other physical channels and signals are still allowed to use a BWP up to the 20 MHz maximum UE RF+BB bandwidth.

Support additional separate early indication(s) [RAN1, RAN2]

UE peak data rate reduction

Relaxation of the constraint ($v_{Layers} \cdot Q_m \cdot f \geq 4$) for peak data rate reduction The relaxed constraint is, e.g., 1 (instead of 4).

The parameters ($v_{Layers}$, $Q_m$, f) can be as in Rel-17 RedCap.

Both 15 kHz SCS and 30 kHz SCS are supported.

Aim to define at most one Rel-18 RedCap UE type for further UE complexity reduction.

The existing UE capability framework is used, and changes to capability signalling are specified only if necessary. By default, all UE capabilities applicable to a Rel-17 RedCap UE are applicable unless otherwise specified.

Notes:

The work defined as part of this WI is not to overlap with LPWA use cases.

Coexistence with non-RedCap UEs and Rel-17 RedCap UEs should be ensured.

This WI considers all applicable duplex modes unless otherwise specified.

Check in RAN #99 regarding:

Whether UE peak data rate reduction for UE is limited only with UE BB bandwidth reduction or standalone . . . "

Example embodiments of the present disclosure may relate to paging handling when (some) enhanced discontinuous reception (eDRX) is not allowed on the cell.

Features as described herein may generally relate to capability filtering. A capability filter may define a set of frequency bands that a network requests a UE to report on, for example in UE capability information message (e.g. frequencyBandListFilter). In TS 38.331, it may be mandatory for both the UE and the NW to support the capability filter. However, in some scenarios, a UE may ignore a capability filter (e.g. even though the UE is capable of supporting it). In other words, a UE may include all supported bands when transmitting the UE capability information message, regardless of which bands were requested by the NW in the capability filter; the UE may consider the UE capability filter as optional.

It may be noted that not all UE may be capable of determining whether to ignore a capability filter.

Features as described herein may generally relate to RRC procedures. The current RRC specification defines the processing delay requirements for RRC procedures. The performance requirement is expressed as the time from the reception of the DL RRC message to the time the UE shall be ready for the reception of uplink grant for the UL RRC response message. Among different RRC procedures, the delay requirement for the UE capability transfer procedure is 80 ms, whereas the delay requirement for the simplest RRC reconfiguration procedure is 10 ms.

The rationale for such delay requirement is coming from the fact that the UE capability transfer procedure involves "UE capability filtering". That is, the UE is required to tailor the content of reported UE capability according to the filter signaled by the network (e.g. a list of frequency bands for which the UE is requested to report UE capability). This procedure requires high demand on the processing and memory in the UE since it is something the UE has to do based on network configuration; hence the long processing delay being allowed for the UE capability enquiry/request.

The UE capability filtering feature was originally meant to address the growing UE capability size due to carrier aggregation (CA), and to make sure the total UE capability size fits within the maximum packet data convergence protocol (PDCP) service data unit (SDU) size (9000 bytes). In case of eRedCap however, the assumption is that the UE supports only single component carrier (CC) operation.

Some reduced capability UEs are not able to perform such capability filtering in a timely manner, and the RRC processing delay requirements may not be met. Defining different RRC processing delay requirements for different UEs would not be desirable since the NW would need to schedule different UEs in different manners. Also, specifying even longer processing times for the capability transfer would delay the RRC establishment even further and would consume more UE battery.

In an example embodiment, the NW may allow, or disallow, the UE to ignore or disregard the capability filter. In other words, the NW may determine whether the UE may treat the capability filter as mandatory or as not mandatory (i.e. optional).

The NW may provide, to the UE, a mandatory capability filter; the capability filter may always be provided to the UE. However, the UE may determine to ignore the capability filter even though it has been indicated to be mandatory; the NW belief that the capability filter will be complied with may be mistaken. In an example embodiment, the UE may indicate, to the NW, that the capability filter has been/is to be ignored, or not complied with. A technical effect of example embodiments of the present disclosure may be to avoid issues (e.g. bands the NW believes are being used by the UE are not being used) that may arise from the NW believing that the capability filter is being complied with, when in actuality it is being ignored by the UE.

In an example embodiment, a UE may determine whether to ignore, or comply with, a capability filter. If the UE determines to ignore the capability filter, the UE may assume the frequency band list filter to be the filter containing all the supported bands of the UE, or at least a subset of the supported bands of the UE. If the UE determines to ignore the capability filter, the UE may not compile a list of candidate band combinations according to filter criteria (e.g. in capability RequestFilterCommon, if included) For example, the compiled list of candidate band combinations may be at least partially incompatible with the filter criteria. If the UE determines to ignore the capability filter, the UE may compile a list of candidate band combinations different than the filter criteria. For example, the UE may compile a list of candidate band combinations that includes bands that are not included in the capability filter (e.g. unrequested bands). For example, the UE may compile a list of candidate band combinations that does not include bands that are included in the capability filter.

In an example embodiment, the gNB and/or network may inform (e.g. with broadcast, system information, and/or dedicated signaling) whether ignoring of the UE capability filter is allowed in the cell. In case ignoring of the UE capability filter is allowed in the cell, the UE may send information on all the supported, or a subset of supported, bands in a UE capability information message. For example, the UE include, in the capability information message, one or more frequency bands, where the one or more frequency bands may or may not be defined by the capability filter.

In case ignoring of the UE capability filter is not allowed in the cell, the UE may follow the UE capability filter. For example, the UE may only include, in the capability information message, frequency bands defined by the capability filter that are also supported by the UE.

In an example embodiment, the UE may include at least all the supported bands as requested by the capability filter, whereas the UE may also include more supported bands in the UE capability message (if allowed based on the NW indication). In other words, if the capability filter is not mandatory or may be ignored, the UE may include a subset of supported frequency bands of the user equipment in the UE capability information without accounting for the UE capability filter.

In an example embodiment, the UE may determine that the capability filter may be ignored, and may accordingly include, in the capability information message, all supported frequency bands of the UE.

In an example embodiment, the UE may determine that the capability filter may be ignored, and may accordingly include, in the capability information message, the supported frequency bands of the user equipment based on the UE capability filter and one or more additional supported frequency bands of the user equipment.

In an example embodiment, the UE may not be allowed to ignore the UE capability filter, but the NW may be allowed to not provide the UE capability filter.

In an example embodiment, in case ignoring the UE capability filter is not allowed in the cell, the UE may be allowed to exceed the RRC processing requirements for the UE capability enquiry/request (e.g. requirements to process the capability enquiry message and be ready to send the UE capability information message within a certain time). For example, a margin may be specified by which the UE may be allowed to exceed the RRC processing requirements.

In an example embodiment, the gNB/network informing/indicating may be included in SIB (e.g., SIB1) for broadcast signaling or in the UE capability enquiry/request for dedicated signaling. It may be noted that a capability enquiry may not be made unless a capability filter has (previously) been provided to the UE.

In an example embodiment, the gNB/network informing/indication may be specific to eRedCap UE, specific to RedCap UEs in general, or applicable to any UE in the cell. Alternatively or in addition, there may be multiple indications for different type of UEs (e.g., RedCap, eRedCap, regular NR).

In an example embodiment, the gNB/network informing/indication whether ignoring of the UE capability filter is allowed in the cell may indicate that ignoring the capability filter is allowed up to the maximum PDCP SDU size (i.e., no UE capability message segmentation is allowed in case any capability filter is signaled by the NW).

In an example embodiment, if the UE ignores the capability filter, the capability filter may be made mandatory via higher layer signaling.

A technical effect of example embodiments of the present disclosure may be to enable the UE to compile/transmit UE capability information without using a capability filter.

A technical effect of example embodiments of the present disclosure may be to enable the NW to allow/disallow the UE to ignore the capability filter.

Example embodiments of the present disclosure may be applicable to RedCap UEs. However, this is not limiting; example embodiments of the present disclosure may also be applicable to other types of UEs.

Figure 2:
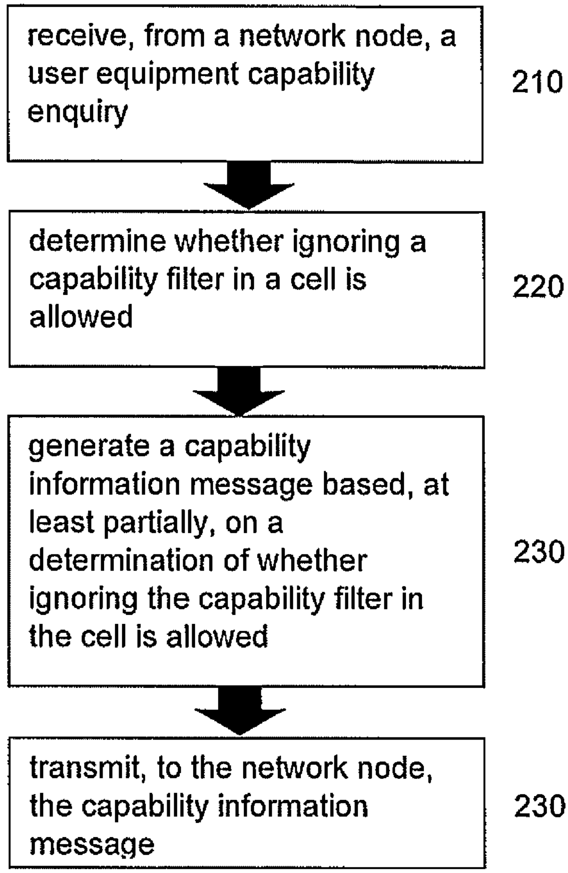
FIG. 2 is a flowchart illustrating steps as described herein.

FIG. 2 illustrates the potential steps of an example method 200. The example method 200 may include: receiving, from a network node, a user equipment capability enquiry, 210; determining whether ignoring a capability filter in a cell is allowed, 220; generating a capability information message based, at least partially, on a determination of whether ignoring the capability filter in the cell is allowed, 230; and transmitting, to the network node, the capability information message. The example method 200 may be performed, for example, with a UE, a RedCap UE, etc. Ignoring the capability filter may comprise compiling a list of candidate band combinations without reference to filter criteria of the capability filter, or compiling a list of candidate band combinations that is different than the filter criteria of the capability filter. The compiled list of candidate band combinations may contain all or a subset of the bands supported by the apparatus.

Figure 3:
FIG. 3 is a diagram illustrating features as described herein.
Figure 3:

FIG. 3 illustrates the potential steps of an example method 300. The example method 300 may include: providing, to a user equipment, an indication of whether the user equipment is allowed to ignore a capability filter in a cell, 310; providing, to the user equipment, a user equipment capability enquiry with respect to, at least, the capability filter, 320; and receiving, from the user equipment in response to the user equipment capability enquiry, a capability information message. The example method 300 may be performed, for example, with a network, base station, network node, eNB, gNB, etc. Ignoring the capability filter may comprise the UE compiling a list of candidate band combinations without reference to filter criteria of the capability filter, or the UE compiling a list of candidate band combinations that is different than the filter criteria of the capability filter. The compiled list of candidate band combinations may contain all or a subset of the bands supported by the UE.

In accordance with one example embodiment, an apparatus may comprise: at least one processor; and at least one memory storing instructions that, when executed by the at least one processor, cause the apparatus at least to: receive, from a network node, a user equipment capability enquiry; determine whether ignoring a capability filter in a cell is allowed; generate a capability information message based, at least partially, on a determination of whether ignoring the capability filter in the cell is allowed; and transmit, to the network node, the capability information message.

The capability filter may define a set of frequency bands for reporting the capability information message.

The example apparatus may be further configured to: in response to a determination of ignoring the capability filter in the cell being allowed, ignore the capability filter and generate the capability information message for at least a subset of frequency bands the apparatus supports.

At least one of: the subset of frequency bands may comprise at least one frequency band the capability filter excludes, or the subset of frequency bands may exclude at least one frequency band the capability filter includes.

The example apparatus may be further configured to: in response to a determination of ignoring the capability filter in the cell being not allowed, comply with the capability filter and generate the capability information message for all frequency bands of the capability filter that the apparatus supports.

The example apparatus may be further configured to: in response to a determination of ignoring the capability filter in the cell being not allowed, comply with the capability filter and generate the capability information message for: a set of frequency bands indicated with the capability filter that the apparatus supports, and one or more additional supported frequency bands.

The example apparatus may be further configured to: in response to a determination of ignoring the capability filter in the cell being not allowed, comply with the capability filter and generate the capability information message for a set of frequency bands indicated with the capability filter that the apparatus supports; and exceed at least one processing requirement for processing the user equipment capability enquiry by a determined margin.

Whether ignoring the capability filter in the cell is allowed may be determined based, at least partially, on at least one of: system information, or dedicated signaling.

In accordance with one aspect, an example method may be provided comprising: receiving, with a user equipment from a network node, a user equipment capability enquiry; determining whether ignoring a capability filter in a cell is allowed; generating a capability information message based, at least partially, on a determination of whether ignoring the capability filter in the cell is allowed; and transmitting, to the network node, the capability information message.

The capability filter may define a set of frequency bands for reporting the capability information message.

The example method may further comprise: in response to a determination of ignoring the capability filter in the cell being allowed, ignoring the capability filter and generating the capability information message for at least a subset of frequency bands the user equipment supports.

At least one of: the subset of frequency bands may comprise at least one frequency band the capability filter excludes, or the subset of frequency bands may exclude at least one frequency band the capability filter includes.

The example method may further comprise: in response to a determination of ignoring the capability filter in the cell being not allowed, complying with the capability filter and generating the capability information message for all frequency bands of the capability filter that the user equipment supports.

The example method may further comprise: in response to a determination of ignoring the capability filter in the cell being not allowed, complying with the capability filter and generating the capability information message for: a set of frequency bands indicated with the capability filter that the user equipment supports, and one or more additional supported frequency bands.

The example method may further comprise: in response to a determination of ignoring the capability filter in the cell being not allowed, complying with the capability filter and generating the capability information message for a set of frequency bands indicated with the capability filter that the user equipment supports; and exceeding at least one processing requirement for processing the user equipment capability enquiry by a determined margin.

Whether ignoring the capability filter in the cell is allowed may be determined based, at least partially, on at least one of: system information, or dedicated signaling.

In accordance with one example embodiment, an apparatus may comprise: circuitry configured to perform: receiving, from a network node, a user equipment capability enquiry; circuitry configured to perform: determining whether ignoring a capability filter in a cell is allowed; circuitry configured to perform: generating a capability information message based, at least partially, on a determination of whether ignoring the capability filter in the cell is allowed; and circuitry configured to perform: transmitting, to the network node, the capability information message.

In accordance with one example embodiment, an apparatus may comprise: processing circuitry; memory circuitry including computer program code, the memory circuitry and the computer program code configured to, with the processing circuitry, enable the apparatus to: receive, from a network node, a user equipment capability enquiry; determine whether ignoring a capability filter in a cell is allowed; generate a capability information message based, at least partially, on a determination of whether ignoring the capability filter in the cell is allowed; and transmit, to the network node, the capability information message.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for: receiving, from a network node, a user equipment capability enquiry; determining whether ignoring a capability filter in a cell is allowed; generating a capability information message based, at least partially, on a determination of whether ignoring the capability filter in the cell is allowed; and transmitting, to the network node, the capability information message.

The capability filter may define a set of frequency bands for reporting the capability information message.

The means may be further configured for: in response to a determination of ignoring the capability filter in the cell being allowed, ignoring the capability filter and generating the capability information message for at least a subset of frequency bands the apparatus supports.

At least one of: the subset of frequency bands may comprise at least one frequency band the capability filter excludes, or the subset of frequency bands may exclude at least one frequency band the capability filter includes.

The means may be further configured for: in response to a determination of ignoring the capability filter in the cell being not allowed, complying with the capability filter and generating the capability information message for all frequency bands of the capability filter that the apparatus supports.

The means may be further configured for: in response to a determination of ignoring the capability filter in the cell being not allowed, complying with the capability filter and generating the capability information message for: a set of frequency bands indicated with the capability filter that the apparatus supports, and one or more additional supported frequency bands.

The means may be further configured for: in response to a determination of ignoring the capability filter in the cell being not allowed, complying with the capability filter and generating the capability information message for a set of frequency bands indicated with the capability filter that the apparatus supports; and exceeding at least one processing requirement for processing the user equipment capability enquiry by a determined margin.

Whether ignoring the capability filter in the cell is allowed may be determined based, at least partially, on at least one of: system information, or dedicated signaling.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: cause receiving, from a network node, of a user equipment capability enquiry; determine whether ignoring a capability filter in a cell is allowed; generate a capability information message based, at least partially, on a determination of whether ignoring the capability filter in the cell is allowed; and cause transmitting, to the network node, of the capability information message.

In accordance with one example embodiment, a non-transitory computer-readable medium comprising program instructions stored thereon for performing at least the following: causing receiving, from a network node, of a user equipment capability enquiry; determining whether ignoring a capability filter in a cell is allowed; generating a capability information message based, at least partially, on a determination of whether ignoring the capability filter in the cell is allowed; and causing transmitting, to the network node, of the capability information message.

In accordance with another example embodiment, a non-transitory program storage device readable by a machine may be provided, tangibly embodying instructions executable by the machine for performing operations, the operations comprising: causing receiving, from a network node, of a user equipment capability enquiry; determining whether ignoring a capability filter in a cell is allowed; generating a capability information message based, at least partially, on a determination of whether ignoring the capability filter in the cell is allowed; and causing transmitting, to the network node, of the capability information message.

In accordance with another example embodiment, a non-transitory computer-readable medium comprising instructions that, when executed by an apparatus, cause the apparatus to perform at least the following: causing receiving, from a network node, of a user equipment capability enquiry; determining whether ignoring a capability filter in a cell is allowed; generating a capability information message based, at least partially, on a determination of whether ignoring the capability filter in the cell is allowed; and causing transmitting, to the network node, of the capability information message.

A computer implemented system comprising: at least one processor and at least one non-transitory memory storing instructions that, when executed by the at least one processor, cause the system at least to perform: causing receiving, from a network node, of a user equipment capability enquiry; determining whether ignoring a capability filter in a cell is allowed; generating a capability information message based, at least partially, on a determination of whether ignoring the capability filter in the cell is allowed; and causing transmitting, to the network node, of the capability information message.

A computer implemented system comprising: means for causing receiving, from a network node, of a user equipment capability enquiry; means for determining whether ignoring a capability filter in a cell is allowed; means for generating a capability information message based, at least partially, on a determination of whether ignoring the capability filter in the cell is allowed; and means for causing transmitting, to the network node, of the capability information message.

In accordance with one example embodiment, an apparatus may comprise: at least one processor; and at least one memory storing instructions that, when executed by the at least one processor, cause the apparatus at least to: provide, to a user equipment, an indication of whether the user equipment is allowed to ignore a capability filter in a cell; provide, to the user equipment, a user equipment capability enquiry with respect to, at least, the capability filter; and receive, from the user equipment in response to the user equipment capability enquiry, a capability information message.

The capability filter may define a set of frequency bands for reporting the capability information message.

The indication may be provided to the user equipment via at least one of: broadcast signaling, system information, or dedicated signaling.

The indication may comprise an indication that the user equipment is allowed to ignore the capability filter in the cell.

The capability information message may comprise, at least, a subset of frequency bands the user equipment supports, wherein at least one of: the subset of frequency bands may comprise at least one frequency band the capability filter excludes, or the subset of frequency bands may exclude at least one frequency band the capability filter includes.

The capability information message may comprise all frequency bands the user equipment supports.

The capability information message may comprise: a set of frequency bands indicated with the capability filter that the user equipment supports, and one or more additional supported frequency bands.

The indication may comprise an indication that the user equipment is not allowed to ignore the capability filter in the cell.

The capability information message may comprise: a set of frequency bands indicated with the capability filter that the user equipment supports.

In accordance with one aspect, an example method may be provided comprising: providing, with a base station to a user equipment, an indication of whether the user equipment is allowed to ignore a capability filter in a cell; providing, to the user equipment, a user equipment capability enquiry with respect to, at least, the capability filter; and receiving, from the user equipment in response to the user equipment capability enquiry, a capability information message.

The capability filter may define a set of frequency bands for reporting the capability information message.

The indication may be provided to the user equipment via at least one of: broadcast signaling, system information, or dedicated signaling.

The indication may comprise an indication that the user equipment is allowed to ignore the capability filter in the cell.

The capability information message may comprise, at least, a subset of frequency bands the user equipment supports, wherein at least one of: the subset of frequency bands may comprise at least one frequency band the capability filter excludes, or the subset of frequency bands may exclude at least one frequency band the capability filter includes.

The capability information message may comprise all frequency bands the user equipment supports.

The capability information message may comprise: a set of frequency bands indicated with the capability filter that the user equipment supports, and one or more additional supported frequency bands.

The indication may comprise an indication that the user equipment is not allowed to ignore the capability filter in the cell.

The capability information message may comprise: a set of frequency bands indicated with the capability filter that the user equipment supports.

In accordance with one example embodiment, an apparatus may comprise: circuitry configured to perform: providing, to a user equipment, an indication of whether the user equipment is allowed to ignore a capability filter in a cell; circuitry configured to perform: providing, to the user equipment, a user equipment capability enquiry with respect to, at least, the capability filter; and circuitry configured to perform: receiving, from the user equipment in response to the user equipment capability enquiry, a capability information message.

In accordance with one example embodiment, an apparatus may comprise: processing circuitry; memory circuitry including computer program code, the memory circuitry and the computer program code configured to, with the processing circuitry, enable the apparatus to: provide, to a user equipment, an indication of whether the user equipment is allowed to ignore a capability filter in a cell; provide, to the user equipment, a user equipment capability enquiry with respect to, at least, the capability filter; and receive, from the user equipment in response to the user equipment capability enquiry, a capability information message.

In accordance with one example embodiment, an apparatus may comprise means for: providing, to a user equipment, an indication of whether the user equipment is allowed to ignore a capability filter in a cell; providing, to the user equipment, a user equipment capability enquiry with respect to, at least, the capability filter; and receiving, from the user equipment in response to the user equipment capability enquiry, a capability information message.

The capability filter may define a set of frequency bands for reporting the capability information message.

The indication may be provided to the user equipment via at least one of: broadcast signaling, system information, or dedicated signaling.

The indication may comprise an indication that the user equipment is allowed to ignore the capability filter in the cell.

The capability information message may comprise, at least, a subset of frequency bands the user equipment supports, wherein at least one of: the subset of frequency bands may comprise at least one frequency band the capability filter excludes, or the subset of frequency bands may exclude at least one frequency band the capability filter includes.

The capability information message may comprise all frequency bands the user equipment supports.

The capability information message may comprise: a set of frequency bands indicated with the capability filter that the user equipment supports, and one or more additional supported frequency bands.

The indication may comprise an indication that the user equipment is not allowed to ignore the capability filter in the cell.

The capability information message may comprise: a set of frequency bands indicated with the capability filter that the user equipment supports.

In accordance with one example embodiment, a non-transitory computer-readable medium comprising instructions stored thereon which, when executed with at least one processor, cause the at least one processor to: cause providing, to a user equipment, of an indication of whether the user equipment is allowed to ignore a capability filter in a cell; cause providing, to the user equipment, of a user equipment capability enquiry with respect to, at least, the capability filter; and cause receiving, from the user equipment in response to the user equipment capability enquiry, of a capability information message.

In accordance with one example embodiment, a non-transitory computer-readable medium comprising program instructions stored thereon for performing at least the following: causing providing, to a user equipment, of an indication of whether the user equipment is allowed to ignore a capability filter in a cell; causing providing, to the user equipment, of a user equipment capability enquiry with respect to, at least, the capability filter; and causing receiving, from the user equipment in response to the user equipment capability enquiry, of a capability information message.

In accordance with another example embodiment, a non-transitory program storage device readable by a machine may be provided, tangibly embodying instructions executable by the machine for performing operations, the operations comprising: causing providing, to a user equipment, of an indication of whether the user equipment is allowed to ignore a capability filter in a cell; causing providing, to the user equipment, of a user equipment capability enquiry with respect to, at least, the capability filter; and causing receiving, from the user equipment in response to the user equipment capability enquiry, of a capability information message.

In accordance with another example embodiment, a non-transitory computer-readable medium comprising instructions that, when executed by an apparatus, cause the apparatus to perform at least the following: causing providing, to a user equipment, of an indication of whether the user equipment is allowed to ignore a capability filter in a cell; causing providing, to the user equipment, of a user equipment capability enquiry with respect to, at least, the capability filter; and causing receiving, from the user equipment in response to the user equipment capability enquiry, of a capability information message.

A computer implemented system comprising: at least one processor and at least one non-transitory memory storing instructions that, when executed by the at least one processor, cause the system at least to perform: causing providing, to a user equipment, of an indication of whether the user equipment is allowed to ignore a capability filter in a cell; causing providing, to the user equipment, of a user equipment capability enquiry with respect to, at least, the capability filter; and causing receiving, from the user equipment in response to the user equipment capability enquiry, of a capability information message.

A computer implemented system comprising: means for causing providing, to a user equipment, of an indication of whether the user equipment is allowed to ignore a capability filter in a cell; means for causing providing, to the user equipment, of a user equipment capability enquiry with respect to, at least, the capability filter; and means for causing receiving, from the user equipment in response to the user equipment capability enquiry, of a capability information message.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:

at least one processor; and at least one memory storing instructions that, when executed with the at least one processor, cause the apparatus at least to:

receive, from a network node, an indication of whether the apparatus is allowed to ignore a capability filter in a cell;

receive, from the network node, a user equipment capability enquiry;

determine, based on the indication, whether ignoring the capability filter in the cell is allowed;

in response to a determination of ignoring the capability filter in the cell being allowed, ignore the capability filter;

generate a capability information message based, at least partially, on the determination of whether ignoring the capability filter in the cell is allowed, wherein in response to the determination of ignoring the capability filter in the cell being allowed, the capability information message is generated for at least a subset of frequency bands the apparatus supports, the subset of frequency bands comprising at least one frequency band the capability filter excludes; and transmit, to the network node, the capability information message.

2. The apparatus of claim 1, wherein the capability filter defines a set of frequency bands for reporting the capability information message.

3. The apparatus of claim 1, wherein the subset of frequency bands excludes at least one frequency band the capability filter includes.

4. The apparatus of claim 1, wherein the at least one memory stores instructions that, when executed with the at least one processor, cause the apparatus to:

in response to a determination of ignoring the capability filter in the cell being not allowed, comply with the capability filter and generate the capability information message for all frequency bands of the capability filter that the apparatus supports.

5. The apparatus of claim 1, wherein the at least one memory stores instructions that, when executed with the at least one processor, cause the apparatus to:

in response to a determination of ignoring the capability filter in the cell being not allowed, comply with the capability filter and generate the capability information message for a set of frequency bands indicated with the capability filter that the apparatus supports; and exceed at least one processing requirement for processing the user equipment capability enquiry by a determined margin.

6. The apparatus of claim 1, wherein the indication is received via system information.

7. An apparatus comprising:

at least one processor; and at least one memory storing instructions that, when executed with the at least one processor, cause the apparatus at least to:

provide, to a user equipment, an indication of whether the user equipment is allowed to ignore a capability filter in a cell;

provide, to the user equipment, a user equipment capability enquiry with respect to, at least, the capability filter; and receive, from the user equipment in response to the user equipment capability enquiry, a capability information message, wherein in response to a determination of ignoring the capability filter in the cell being allowed, the capability information message is generated for at least a subset of frequency bands the user equipment supports, the subset of frequency bands comprising at least one frequency band the capability filter excludes.

8. The apparatus of claim 7, wherein the capability filter defines a set of frequency bands for reporting the capability information message.

9. The apparatus of claim 7, wherein the indication is provided to the user equipment via at least one of:

broadcast signaling, system information, or dedicated signaling.

10. The apparatus of claim 7, wherein the indication comprises an indication that the user equipment is allowed to ignore the capability filter in the cell.

11. The apparatus of claim 10, wherein the capability information message comprises, at least, a subset of frequency bands the user equipment supports, wherein at least one of: the subset of frequency bands comprises the at least one frequency band the capability filter excludes, or the subset of frequency bands excludes at least one frequency band the capability filter includes.

12. The apparatus of claim 10, wherein the capability information message comprises all frequency bands the user equipment supports.

13. The apparatus of claim 7, wherein the indication comprises an indication that the user equipment is not allowed to ignore the capability filter in the cell.

14. A method performed by a user equipment, the method comprising:

receiving, from a network node, an indication of whether the user equipment is allowed to ignore a capability filter in a cell;

receiving, from the network node, a user equipment capability enquiry;

determining, based on the indication, whether ignoring the capability filter in the cell is allowed;

in response to a determination of ignoring the capability filter in the cell being allowed, ignoring the capability filter;

generating a capability information message based, at least partially, on a determination of whether ignoring the capability filter in the cell is allowed, wherein in response to the determination of ignoring the capability filter in the cell being allowed, the capability information message is generated for at least a subset of frequency bands the apparatus supports, the subset of frequency bands comprising at least one frequency band the capability filter excludes; and transmitting, to the network node, the capability information message.

15. The method of claim 14, wherein the capability filter defines a set of frequency bands for reporting the capability information message.

16. The method of claim 14, further comprising:

in response to a determination of ignoring the capability filter in the cell being not allowed, complying with the capability filter and generate the capability information message for all frequency bands of the capability filter that the apparatus supports.

17. The method of claim 14, further comprising:

in response to a determination of ignoring the capability filter in the cell being not allowed, complying with the capability filter and generate the capability information message for a set of frequency bands indicated with the capability filter that the apparatus supports; and exceeding at least one processing requirement for processing the user equipment capability enquiry by a determined margin.

18. The method of claim 14, wherein the indication is received via at least one of: system information, or dedicated signaling.

* * * * *